United States Patent [19]

Shipp

[11] Patent Number: 5,394,187

[45] Date of Patent: Feb. 28, 1995

[54] VIDEO IMAGING SYSTEMS AND METHOD USING A SINGLE INTERLINE PROGRESSIVE SCANNING SENSOR AND SEQUENTIAL COLOR OBJECT ILLUMINATION

[75] Inventor: John I. Shipp, Tullahoma, Tenn.

[73] Assignee: Apollo Camera, L.L.C., Tullahoma, Tenn.

[21] Appl. No.: 156,377

[22] Filed: Nov. 22, 1993

Related U.S. Application Data

[63] Continuation-in-part of Ser. No. 905,278, Jun. 26, 1992, Pat. No. 5,264,925.

[51] Int. Cl.$^6$ ............................................. H04N 9/04
[52] U.S. Cl. .................................... 348/269; 348/322
[58] Field of Search ............... 348/222, 234, 266, 268, 348/269, 322; H04N 9/04; 358/44, 41, 43

[56] References Cited

U.S. PATENT DOCUMENTS

| | | | |
|---|---|---|---|
| 4,074,306 | 2/1978 | Kakinuma et al. | 358/1 |
| 4,253,447 | 3/1981 | Moore et al. | 128/6 |
| 4,862,275 | 8/1989 | Meisenzahl | 358/213.29 |
| 4,967,264 | 10/1990 | Parulski | 358/44 |
| 5,264,925 | 11/1993 | Shipp et al. | 358/44 |

FOREIGN PATENT DOCUMENTS 63-227293 9/1988 Japan .

Primary Examiner—James J. Groody
Assistant Examiner—Sherrie Hsia
Attorney, Agent, or Firm—Waddey & Patterson; Mark J. Patterson

[57] ABSTRACT

A sequential video imaging system uses a video sensor having interline architecture whereby image data is moved from sensor elements to adjacent interlined storage elements. The object being viewed is sequentially illuminated with colored light sources to produce luminance and chrominance video signals. Binning of image data corresponding to low level color signals is carried out in the sensor. A digital signal processor includes data buffering and averaging circuits whereby the camera head and base unit can be operated asynchronously.

10 Claims, 6 Drawing Sheets

| TIME, Tn | Read D0 | D1 | D2 | D3 |
|---|---|---|---|---|
| T0 | Y1 | - | - | - |
| T1 | Y1 | - | - | - |
| T2 | R1 | Y1 | - | - |
| T3 | Y2 | Y1 | R1 | - |
| T4 | Y2 | Y2 | R1 | - |
| T5 | B1 | Y2 | R1 | B1 |
| T6 | Y3 | Y3 | R1 | B1 |
| T7 | Y3 | Y3 | R2 | B1 |
| T8 | R2 | Y4 | R2 | B1 |
| T9 | Y4 | Y4 | R2 | B2 |
| T10 | Y4 | Y5 | R2 | B2 |

*FIG. 5*

VIDEO IMAGING SYSTEMS AND METHOD USING A SINGLE INTERLINE PROGRESSIVE SCANNING SENSOR AND SEQUENTIAL COLOR OBJECT ILLUMINATION

This is a continuation-in-part of U.S. patent application Ser. No. 905,278, filed Jun. 26, 1992, U.S. Pat. No. 5,264,925, for "Single Sensor Video Imaging System and Method Using Sequential Color Object Illumination".

BACKGROUND OF THE INVENTION

The present invention relates to an improved system and method used for processing color images from a sequentially illuminated object to form high resolution color video signals suitable for use in viewing the object on a video monitor.

It will be appreciated by those skilled in the art that the use of charge coupled devices (CCD) as sensors in video imaging systems has become quite popular, as, for example, where small size and low power consumption is desired. In the processing of color video images, it is preferred for a number of reasons that a single CCD sensor be used.

There are three basic types of solid state devices that are usable as sequential video sensors. Full frame CCD sensors employ an array of integrating CCD devices which act as photo sensitive capacitors. The images are projected onto the parallel array which acts as the image plane. The device partitions the scene information into discrete sensor elements defined by the number of pixels. The charge that accumulates in each pixel during the integration period, representing rows of scene information, is shifted in parallel fashion along rows and columns (parallel register) of the photo sensitive CCD's to an output serial register. The image data is then shifted in serial fashion to a signal sensing output amplifier during the data readout cycle. This process repeats until all rows are transferred off of the device. The output from the amplifier can then be used to re-construct the image. Because the parallel register of full frame CCD's is used both for scene detection and data readout, either a shutter or synchronized strobe illumination must be used to preserve integrity of the image.

Some full frame CCD sensors have, adjacent to the array of sensor elements, a separate but identical parallel array of non-photosensitive CCD elements for storage of image data during odd or even fields. Thus, readout of the storage CCD array can take place while the image CCD array is integrating the next image frame. These "frame transfer" detectors do not require shutters or strobed illumination. However, performance is compromised by the fact that frame transfer CCD sensors have half the number of vertical lines of resolution as the equivalent full frame device. Also, because integration is still occurring during the transfer of image data from the image array to the storage array, "smearing" of the re-constructed image can occur.

Interline CCD sensors use an array of photodiodes as integrating sensor elements. Each sensor element is electrically connected to an adjacent non-photosensitive or light-shielded CCD storage element, which are arranged in a line between each line of image sensor elements. After integration of a scene, the signal or charge collected in each sensor element or pixel is shifted all at once into the light shielded parallel CCD array. Readout from this storage CCD array then can occur during the next integration period, thus yielding continuous operation. Interline CCD sensors are manufactured in both interlaced and progressive scan formats. Interlaced sensor devices are used in conjunction with NTSC or PAL video formats. There is much more flexibility in the progressive scan devices as to integration and read out timing. Other advantages of the interline devices are that the photodiodes used as image sensor elements have a much higher sensitivity in the blue spectrum where illumination LED's are less efficient.

The advantage of a full frame or interline progressive scan CCD sensor is that they contain the complete complement of vertical lines. Therefore, higher resolution images with less "smear" can be obtained. The frame transfer and interline interlaced sensors are sometimes called video devices because they are compatible with conventional NTSC or PAL video field timing and produce interlaced output of 480 pseudo lines of resolution (every other line is temporally displaced by a field period). The advantage of the frame transfer type is that integration can proceed as read out occurs. Full frame devices give 480 total lines of true resolution but they must be shuttered or the light source strobed off during readout. Both interlaced and progressive scan interline devices, however, can be read during integration since the storage CCD arrays are not photosensitive.

Prior art sequential illumination and processing methods are deficient in either the level of resolution obtainable, in their need for a higher rate of sampling of data from the sensor, or in their relative sensitivity. For example, in U.S. Pat. No. 4,253,447 is disclosed a sequential illumination process which requires reading out of only half the field lines (corresponding to either the even or the odd fields), resulting in a 50% reduction in vertical resolution. The '447 patent also discloses a second method whereby the object is sequentially illuminated by all three primary colors during each of the odd and even field periods. Unfortunately, this method requires that the CCD data be read at three times the standard speed which is not always possible. In addition, this technique requires six field memories and for a given signal-to-noise ratio, it is less sensitive than the current invention by a factor of three.

Prior art light sources used in conjunction with a sequential color video camera include: sequentially lighting the object field with each primary color by rotating a three-color segmented filter in the path of a whim light source; sequentially illuminating the object with a plurality of solid state light emitting chips mounted in a single transparent package, as disclosed in U.S. Pat. No. 4,074,306; or sequentially illuminating the object with three white strobe lights with a different primary color filter in each of the strobe light paths, as shown in U.S. Pat. No. 4,253,447. All of these methods are troublesome.

Applicant's co-pending U.S. patent application Ser. No. 905,278, filed Jun. 26, 1992, the drawings and specification of which, as amended, are incorporated by this reference, describes a novel method of producing video images using a single sensor, sequential primary color illumination, and non-color specific RGB video data memories.

Two major problems are manifested in this prior art. The efficiencies of green and blue LED's are lower than the red LED's. The efficiency of red LED's are typically 4%, greens 0.4%, and blues 0.04%. The efficiency differences, green to red, can be solved by using multiple green LED's. However, the very low efficiency of the blue LED's make the use of an adequate number of blue LED's impractical. The prior art required that a high gain video amplifier be switched into the video signal during the blue portion of the illumination sequence to insure proper white balance. The high blue signal gain requirement causes circuit instability and limits the dynamic range of the camera.

Traditional methods of compensating for the low signal strengths have resulted in a reduced temporal or spatial resolution to the point where image quality is unsatisfactory. In addition, still images obtained from prior art video imaging systems are blurred, owing to temporal differences between the two field images and to color edge effects on moving objects.

SUMMARY OF THE INVENTION

The human eye perceives spatial and temporal resolution, primarily through luminance rather than chrominance. The system of the present invention teaches a method of increasing the signal level and signal-to-noise ratio of, for example, the blue signal in a color sequential camera, by creating luminance and chrominance signals from image data accumulated in a CCD sensor. The chrominance signals are spatially and temporally compressed to yield higher signal and signal-to-noise ratios with very little resulting loss in perceived resolution, either spatial or temporal. This is accomplished by using an interline progressive scan video detector device. A luminance signal is created by simultaneously illuminating the object with red and green LED's for a half frame period which is alternated between full frame illumination periods of red and blue LED's. The red and blue signals strengths are increased by adding charge from adjacent pixels together within the sensor. This method results in lowering the gain requirement for the blue signal with little loss in perceived temporal or spatial resolution since the luminance signal contains full temporal and spatial resolution. The number of pixels added together can be varied, according to one embodiment of the present invention, depending on the blue signal strength. Still images extracted from the improved camera are also sharper. Additionally, the resulting output signal can be converted to either NTSC or PAL formats without the need for changing sensors.

An object of the present invention, then, is to eliminate flicker in a simplified sequential color video system while maintaining good spatial and temporal resolution.

A further object of the present invention is to provide a simplified sequential color video imaging system having improved signal strengths and signal-to-noise ratios while compensating for the lower efficiency of green and blue LED illumination sources.

BRIEF DESCRIPTION OF THE DRAWINGS

FIG. 5 is a table showing the timing relationship among the signals appearing at the various signal nodes of the embodiment of FIG. 4.

DESCRIPTION OF THE PREFERRED EMBODIMENT

Figure 1:
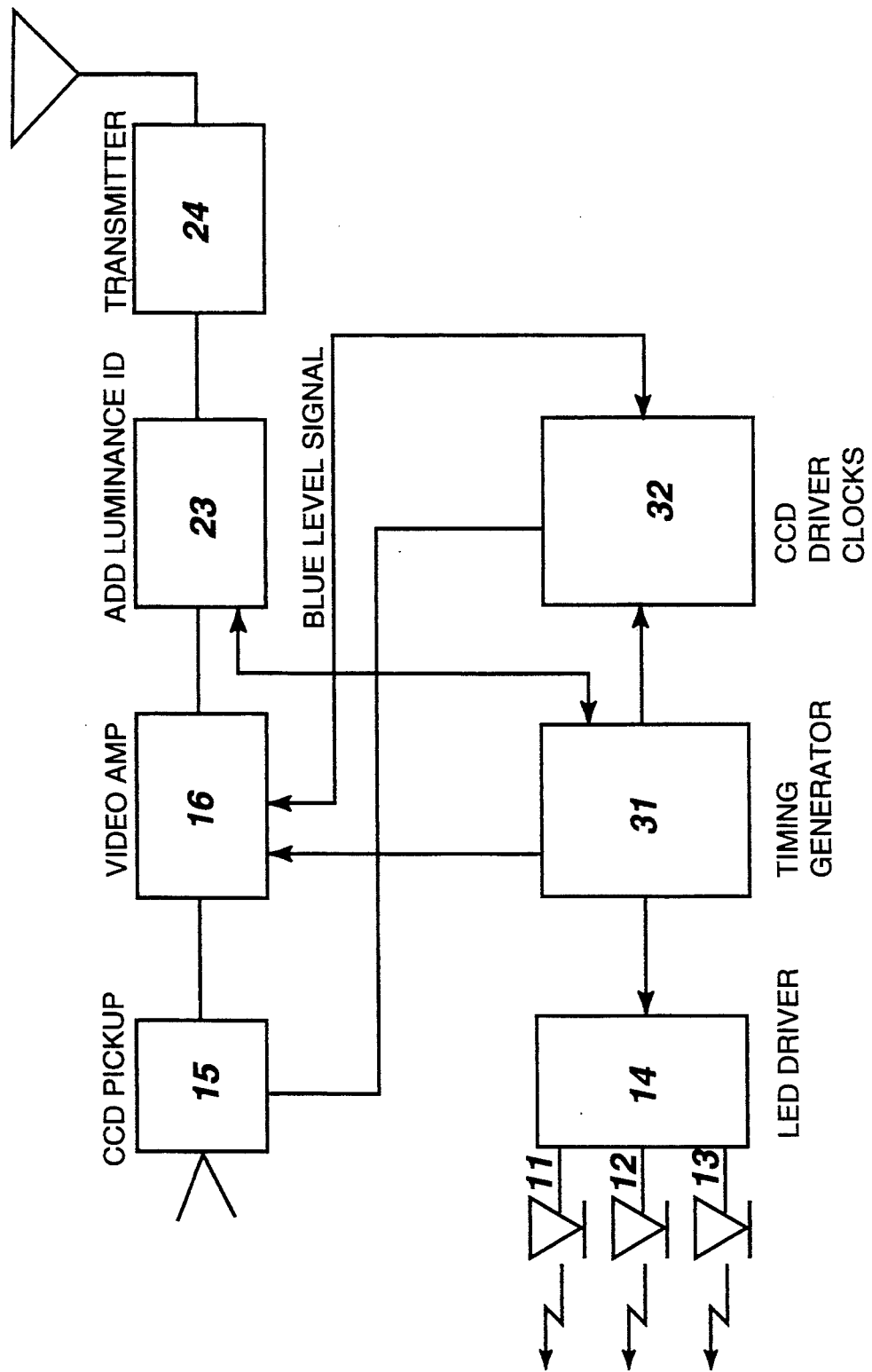
FIG. 1 is a block diagram representation of the video camera head portion of the improved system of present invention.
Figure 2:
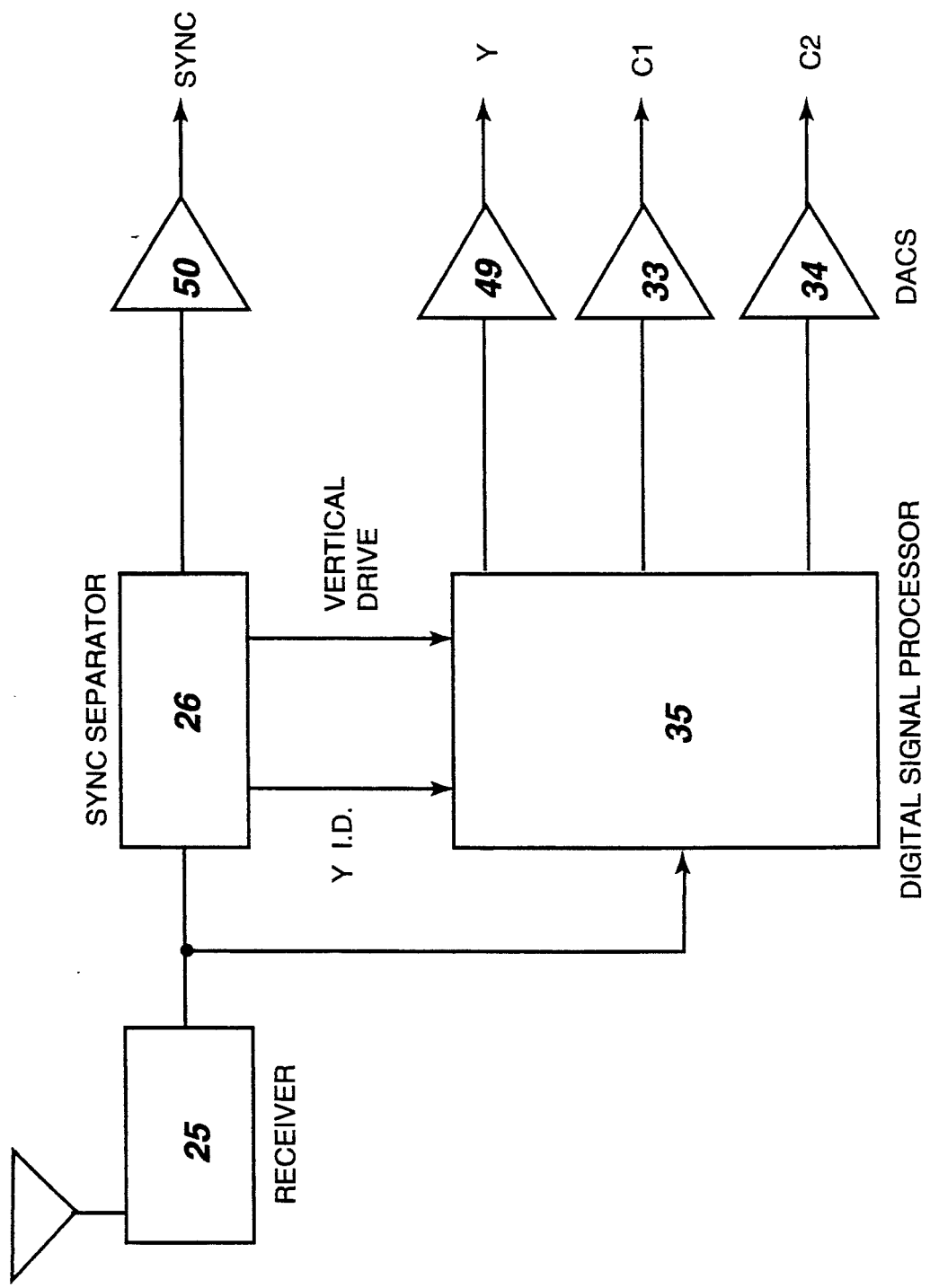
FIG. 2 is a block diagram representation of the base unit of the improved system of the present invention.

Referring now to FIGS. 1 and 2, the general arrangement of the functional blocks of the improved sequential video camera system is shown. The camera head portion of FIG. 1 would, in the preferred embodiment, be part of an endoscopic camera used for viewing objects located within a body cavity. Accordingly, the illumination source of the system, including red, green, and blue LED's 11, 12, and 13, would preferably be located at or near the distal end of the endoscope, for purposes of directing colored light at the object to be viewed, in a sequential manner described below. LED driver 14 is operably connected to each LED 11, 12, 13, providing a controllable activation voltage and current in response to master timing signals generated by timer 31.

Figure 6:
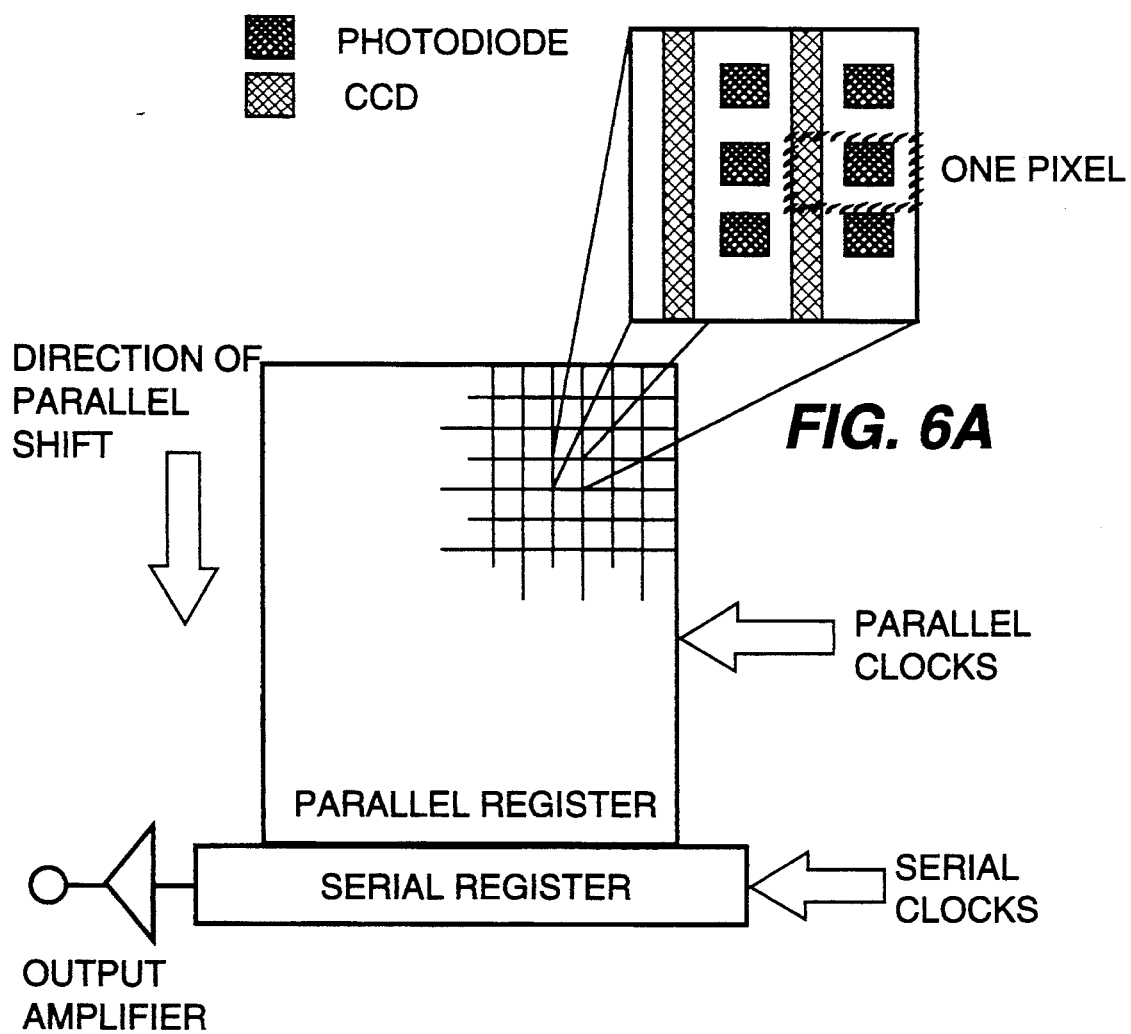
FIG. 6 is an block diagram illustration of a typical CCD sensor with interline architecture.

Light reflected from the object is focused on CCD sensor 15 having an interline frame transfer architecture as in FIG. 6, such as the Model CCB/M27 from Sony Corporation of America. Sensor driver/timer 32 provides horizontal and vertical timing signals to sensor 15, also in response to timing signals from master timer 31. Serial video image data from sensor 15 is transferred to video amplifier 16 which has a switchable gain feature, coupled with automatic gain control, to allow amplifier 16 to apply a different level of gain to each different color. Amplifier 16 also has a dark clamping feature and can also be provided with an analog-to-digital convertor when transmission of digitized rather than analog video data from the camera head is desired.

Because the system and method of the present invention relies on the generation and use of chrominance ("C") and luminance ("Y") video signals, a luminance ID circuit 23, also synchronized with master timer 31, is used to add an identifier signal to communicate to the camera base unit (FIG. 2) which signals in the sequence of digitized data received by the base unit is a Y signal. The video data, with luminance identifier added, and further including synchronization and vertical drive timing signals, is then transmitted from the camera head of FIG. 1 to the base unit of FIG. 2 by transmitter 24. Preferably, wireless radio communications are used as the link between the camera head and base unit but any conventional hardwired or wireless remote link can be employed.

Looking at FIG. 2, the transmitted analog (or digital) video data is accepted at receiver 25 where it is then sent concurrently to sync separator 26 and digital signal processor (DSP) 35. Sync separator 26 strips the sync, vertical drive, and luminance ID signals from the video signal in a conventional manner well known to those skilled in the art. DSP 35 is a microprocessor having the further capability of performing analog to digital conversion, as well as buffering (storing), averaging and filtering of digital data in real time, at video rates.

After and during processing of the video image data, luminance ID signals, and vertical drive signals by DSP 35 as described below, a digitized luminance (Y) signal is generated and provided to digital to analog convertor (DAC) 49. First and second chrominance (C1 and C2) signals are also generated and directed to DAC's 33 and 34. The resulting analog outputs of DAC's 49, 33, and 34 are then usable in a conventional manner by a YC video monitor which, in conjunction with a sync signal from DAC 50, reconstructs and displays the image of the object being viewed.

The processing method used in the present system builds on and is an improvement over the method described in U.S. patent application Ser. No. 905,278 which uses sequential illumination of the object by separately activated red, green, and blue LED's and non-color specific memories. The improved method uses sequential illumination by Y (luminance, red and green together), red, and blue light, with storage and averaging of the sensed and video data.

Conventionally, luminance is defined as:

$$Y = 0.3R + 0.6G + 0.1B \quad (1)$$

where R, G, and B are the red, green, and blue light (RGB) video signal levels. For purposes of maximizing the blue signal strength in accordance with one objective of the system, Y herein is defined as:

$$Y = aR + bG \quad (2)$$

where a and b are somewhat arbitrary constants such that $a+b=1$. Because of spatial resolution considerations, the value of b should preferably be between 0.3 and 0.7. The choice of values within this range is based somewhat on subjective perceptions of the corresponding image quality. Otherwise the values of b (and hence a) are selected based on thermal considerations. The lack of efficiency of green LED's would suggest lower values for b provided the resulting image quality is adequate. With $a=b=0.5$ a high quality image is readily obtainable, for example.

The first and second chrominance signals are defined by:

$$C1 = Y - R \quad (3)$$

$$C2 = Y - B \quad (4)$$

Figure 3:
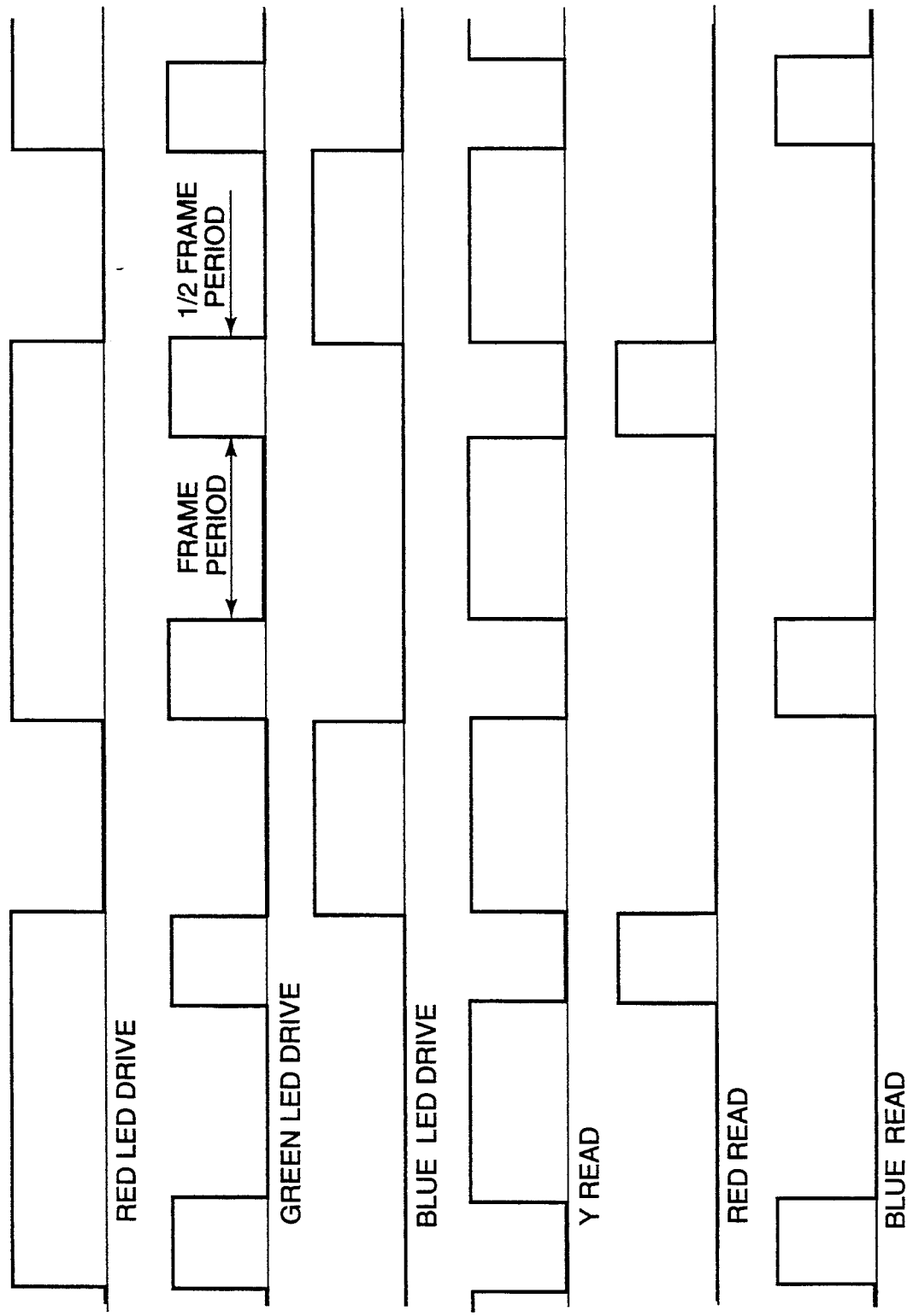
FIG. 3 is timing diagram showing the timing relationship between and among activation of the red, green, and blue LED illumination sources and readout of the video data integrated in the CCD detector.

Referring to the timing diagram in FIG. 3, the sequence of illumination and readout events in the system are illustrated. The sequence begins when LED driver 14, responding to signals from master timer 31, activates red and green LED's 11 and 12 together, in accordance with equation (2), for one-half frame period (first and second lines of FIG. 3). Thus, in accordance with equation (2), red LED's 11 and green LED's 12 will be activated for equal periods, with the drive signals applied by driver 14 controlled such that the total light output from red LED's 11 and green LED's 12 will be equal during the illumination period. Of course, if constants a and b of equation (2) are chosen to have different values, the drive signals from driver 14 applied to red and green LED's 11 and 12 will have to be adjusted so that the respective light outputs during the illumination period reflect the ratio of the a and b constants.

Preferably, one full frame period has a duration of 1/30 second. During this first one-half frame illumination period, the combined red and green light reflected from the object being viewed is focused on CCD sensor 15 where it is integrated by the photosensitive CCD image array. Then red LED's 11 are turned on alone for a full frame period and, in response to master timer 31 and CCD driver 32, the integrated luminance Y data integrated during the first Y illumination period is shifted to the light shielded (or non-photosensitive) parallel CCD readout array. Thus, during this red illumination period, the luminance signal Y is read out from sensor 15 and provided to video amplifier 16.

A second Y (red plus green) illumination period follows. At the beginning of this second Y illumination period, the red reflected light data which was integrated in the photosensitive CCD image array of sensor 15 is shifted to the CCD readout array and provided to video amplifier 16. Next, blue LED's 12 are activated by master timer 31 and driver 14 for a full frame period while the second Y signal is shifted to the CCD readout array and read out to amplifier 16. Next, Y is again illuminated for one-half frame period while the blue signal is shifted and read out. During the blue signal readout, a timing signal from master timer 31 and CCD driver 32 causes video amplifier 16 to increase its gain by a pre-programmed amount to compensate for the lower blue signal level.

The ratio of the duration of the Y luminance signal illumination periods to the duration the red and blue (chrominance) signal illumination periods can be varied, depending on the readout time required or preferred for the red and blue signals.

During the periods of red and blue signal readout, modified timing signals are sent by master timer 31 to CCD driver 32 so that at least two vertical lines of data from the image array of sensor 15 are summed into the sensor's parallel (horizontal) register while at least two horizontal sensor elements (pixels) are summed onto the output. This "binning" technique has the effect of summing at least a $2 \times 2$ matrix of pixels (image sensor elements), resulting in an average signal strength increase of a factor of four for both the red and blue signals. The red and blue signal levels can, if needed, be increased by a factor of nine by binning $3 \times 3$ pixel matrices, or by a factor of $n^2$, for a matrix of $n \times n$. The signal-to-noise ratio will increase by a factor of two for $2 \times 2$ binning and by a factor of three for $3 \times 3$ binning.

As shown on FIG. 1, blue signal strength data can be fed to CCD driver 32 to select a $2 \times 2$, $3 \times 3$ (or higher) binning matrix to increase the blue signal level.

The sequential Y, red, and blue signals are then transmitted to the base unit as shown in FIG. 2, either by wire or wireless means, in either digital or analog format. The sync, vertical drive, and the Y ID signals are stripped and the signals are supplied to DSP 35. DSP 35 includes conventional processing means for averaging the Y signal over the chosen $n \times n$ pixel matrix so that the Y signal temporally matches the binned red and blue signals. DSP 35 further produces the first and second chrominance signals as per equations (3) and (4) above and outputs these digitized signals to DAC's 49, 33, and 34, to form analog YC signals which can be displayed on a YC monitor. DSP 35 can also produce RGB, NTSC, or PAL format outputs.

It should be noted that it is not necessary for the frame rate of the camera head to match the timing of NTSC or PAL formats. DSP 35 contains sufficient data buffers and timing circuits, well known to those skilled in the art, such that slower frame rates can be used in the camera head to further increase the signal strengths by using longer integration times. For example, if the camera head frame rate needed to be lowered by ten percent to synchronize it to either NTSC or PAL timing, DSP 35 would be programmed to insert a repeat frame in the video data stream every tenth frame.

Figure 4:
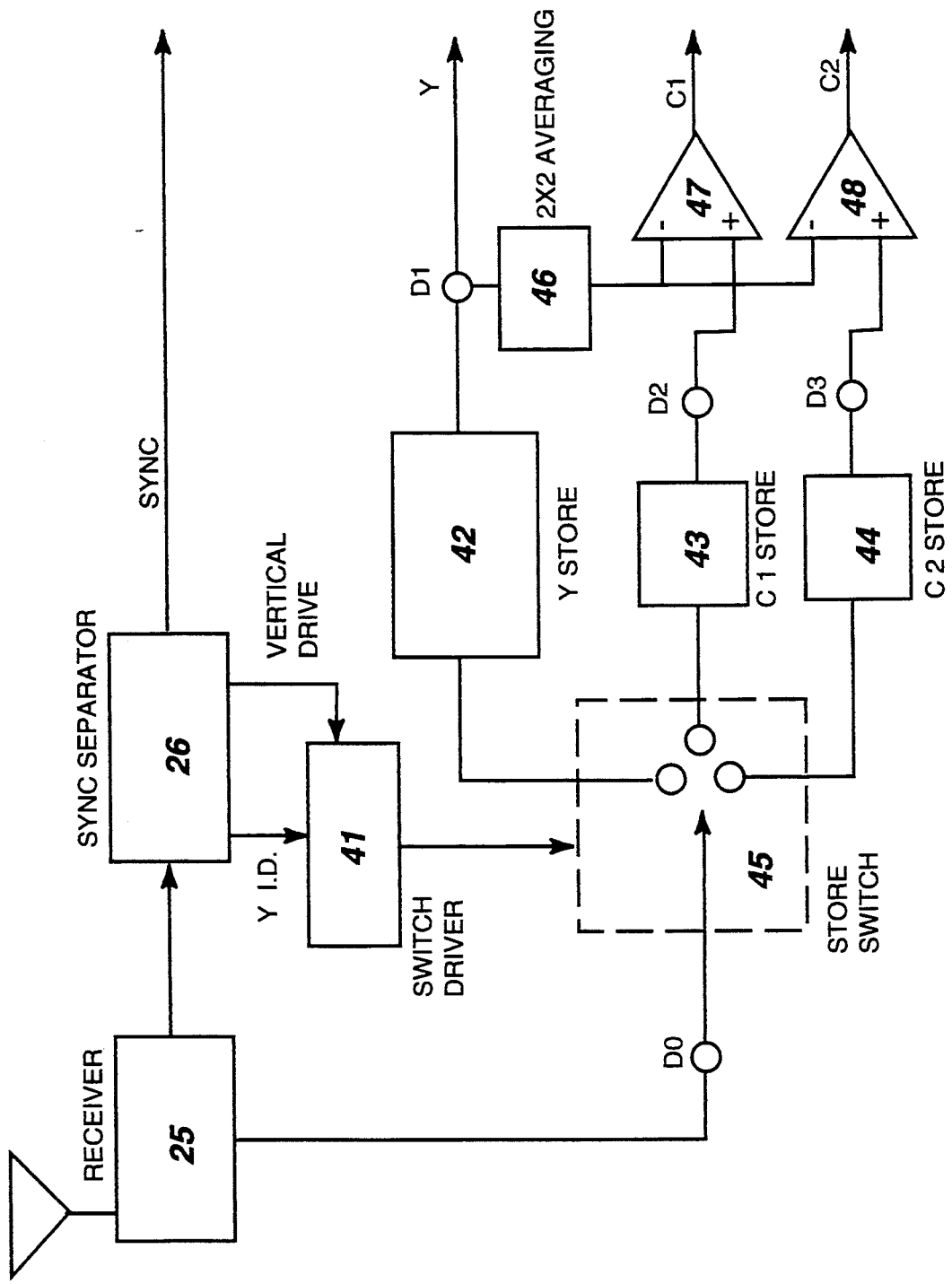
FIG. 4 is a block diagram of one embodiment the base unit of one embodiment of the system FIG. 2 which uses synchronous field timing.

Looking now at FIG. 4, further detail of a preferred embodiment of the system, along with signal nodes D0, D1, D2, and D3 corresponding to FIG. 5, is shown. The embodiment of FIGS. 4 and 5, while implementing the basic method of the improved camera system, also uses features of the novel method of applicant's co-pending U.S. patent application Ser. No. 905,278. In this embodiment of the improved camera system, the camera head (FIG. 2) and base units must be operated synchronously.

Luminance ID and vertical drive signals, stripped from the video data received from the camera head, are sent from sync separator 36 to switch driver 41. The output of switch driver 41 is used to control the operation of data storage switch 45, which in accordance with the timing scheme of FIG. 5, alternately connects the video data input node D0 from receiver 25 to either Y signal memory 42, first chrominance signal (C1) memory 43, or to second chrominance signal (C2) memory 44. Y memory 42 is a storage device or shift register capable of storing a full frame of data. First and second chrominance memories 43 and 44 should have a one-quarter frame capacity for 2×2 binning. The 2×2 averaging functions are carried out in averaging circuit 46, with subtraction as needed for equations (3) and (4) above implemented in summing circuits 47 and 48.

The table of FIG. 5 illustrates the sequence of illumination periods, readout periods, and delays of the chrominance and luminance signals, at each of a sequence one-half frame times, T.

Images with depth perception can be produced by the improved camera system by switching a synchronized shutter from a left optical zone in the endoscope to the right zone in each complete sequence Y-Red-Y-Blue.

Thus, although there have been described particular embodiments of the present invention of an improved sequential LED video camera system, it is not intended that such references be construed as limitations upon the scope of this invention except as set forth in the following claims.

What I claim is:

1. A sequential color video imaging system for viewing an object, said system comprising:
   a. an interline video sensor having an image array of horizontal and vertical photosensitive elements and a corresponding storage array of video data storage elements, said photosensitive elements responsive to levels of light reflection from the object;
   b. object illumination means to illuminate the object, said object illumination means including separately operable red, green, and blue light sources;
   c. timing and driver means operably connected to said object illumination means to activate said red, green, and blue light sources in a pre-determined repeating sequence of red and green, red, red and green, and blue light illumination periods;
   d. sensor driver means operably connected to said sensor to shift the video data responsive to the level of light reflected from the object during each of said illumination periods from said image array to said storage array; and
   e. processor means operably connected to said storage array of said sensor, to read and transform the video data shifted to said storage array into a corresponding sequence of chrominance and luminance video signals representing the object viewed by said imaging system.

2. The system of claim 1 further comprising video amplifier means to amplify the video data from said storage array before processing in said processor means, said amplifier means having a signal gain which is switchable in response to an external signal whereby differing amplifier gains can be applied to the video data corresponding to different illumination colors.

3. The system of claim 2, said video sensor further comprising a parallel video data shift register, a serial video data shift register, and means responsive to binning signals from said sensor driver means whereby at least two vertical lines of the video data corresponding to a single illumination color from said storage array are summed in said parallel shift resister, and whereby at least two horizontal lines of the video data are summed from said parallel shift register into said serial shift register, and said sensor driver means including means to generate said binning signals whereby a matrix of at least a 2×2 array of said photosensitive elements having red or blue video data are summed in said sensor before further processing.

4. The system of either of claims 2 or 3, said processor means comprising video data averaging and video data subtraction circuits.

5. The system of either claim 2, or 3 further comprising means for wireless transmission of said video data to a remote location.

6. An improved method of processing video data in a sequential color video camera comprising the steps of:
   a. illuminating an object to be viewed with repeating sequences of red and green, red, red and green, and blue light during corresponding luminance signal, first chrominance signal, luminance signal, and second chrominance signal illumination periods;
   b. sensing and integrating in a video data sensor array a level of light reflected by the object during each of said luminance signal and said first and second chrominance signal illumination periods;
   c. shifting at the end of each of said luminance and first and second chrominance signal illumination periods, the video data from said video data sensor array into a video data storage array;
   d. reading the video data stored in said video data storage array into a video amplifier;
   e. processing the video data outputted from said video amplifier corresponding to said luminance signal illumination periods to produce a luminance video signal; and
   f. processing the video data outputted from said video amplifier corresponding to said first and second chrominance illumination periods to produce first and second chrominance video signals.

7. The method of claim 6 wherein said luminance signal illumination periods have a duration of a fraction of the duration of said first and second chrominance signal illumination periods, said fraction determined by a readout time of said first and second chrominance signals.

8. The method of claim 7 further comprising the step of binning in said video data sensor array at least two vertical lines of the video data integrated in said sensor array during said first and second chrominance signal illumination periods, producing binned red and blue video signals whereby video image signal strengths corresponding to red and blue light illumination of the object are increased.

9. The method of claim 8 wherein said processing of the video data includes averaging of luminance signals to provide an averaged luminance signal whereby said averaged luminance signal temporally matches said binned red and blue video signals, and wherein said first chrominance video signal is obtained by subtracting said binned red signal from said averaged luminance signal and said second chrominance signal is obtained by subtracting said binned blue signal from said averaged luminance signal.

10. The method of claim 6 further comprising the step of switching in a predetermined sequential manner said video data from said video amplifier among Y storage and first and second chrominance memory units.

* * * * *